May 21, 1957     A. H. CANDEE ET AL     2,793,042
GEAR CHUCK

Filed Dec. 29 1954     2 Sheets-Sheet 1

*INVENTORS*
ALLAN H. CANDEE
MARTIN A. DONOHOE

BY *Richard W. Treverton*
*ATTORNEY*

May 21, 1957 A. H. CANDEE ET AL 2,793,042
GEAR CHUCK
Filed Dec. 29, 1954 2 Sheets-Sheet 2

INVENTORS
ALLAN H. CANDEE
MARTIN A. DONOHOE
BY *Richard W. Treverton*
ATTORNEY

United States Patent Office 2,793,042
Patented May 21, 1957

2,793,042
GEAR CHUCK

Allan H. Candee and Martin A. Donohoe, Rochester, N. Y., assignors to The Gleason Works, Rochester, N. Y., a corporation of New York Application December 29, 1954, Serial No. 478,360

10 Claims. (Cl. 279—106)

The present invention relates to a gear chuck adapted to center a gear with respect to its teeth, whereby further operations on the gear, such for example as grinding its bore, may be accurately performed with reference to the teeth.

The chuck is provided with a plurality of pinions which are adjustable on eccentric pins, and these pins are rotatable in blocks which are adjustable radially on the chuck body. By making these adjustments gears of various tooth members may be readily accommodated in the same chuck. Chucking is effected by placing the work gear between the pinions and rotating it until it is tightly clamped.

Figure 1:
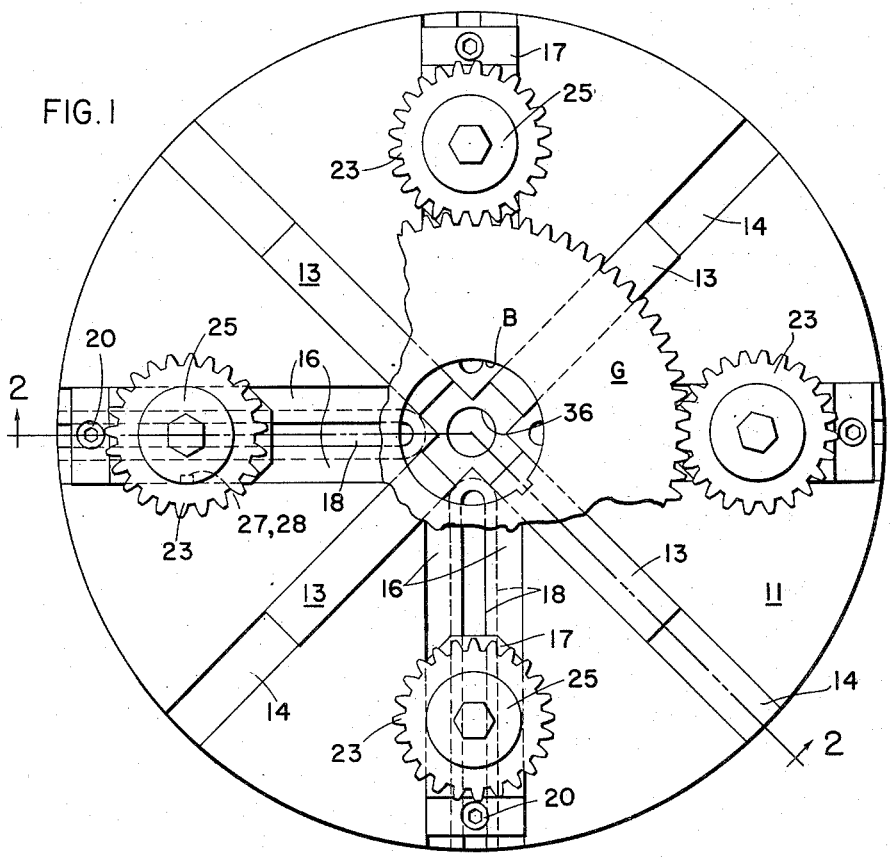
Figure 2:
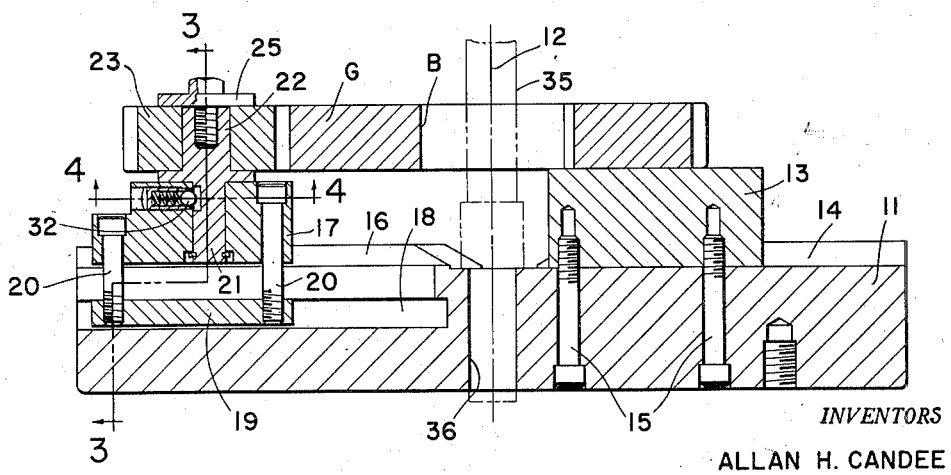
Figure 3:
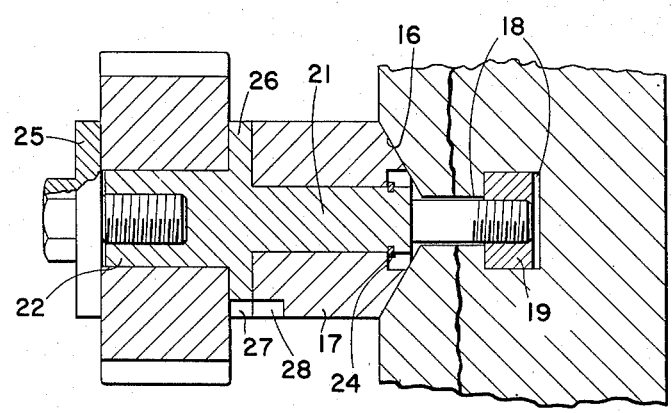
Figure 4:
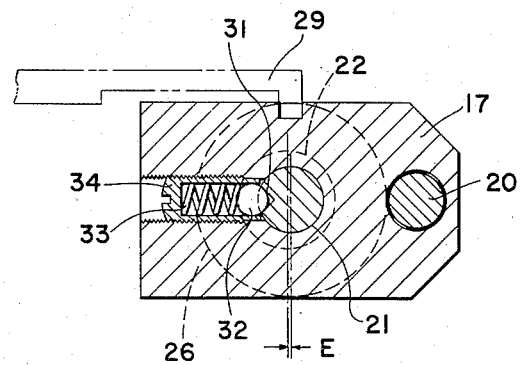

The foregoing and other objects and advantages of the invention will appear from the following description made with reference to the drawings wherein:

Fig. 1 is a front view, looking at the face of the chuck;

Fig. 2 is a sectional view, taken in the planes indicated by section line 2—2 of Fig. 1; and, Figs. 3 and 4 are detail sectional views taken respectively in the planes indicated by section lines 3—3 and 4—4 of Fig. 2.

The particular embodiment of the invention shown in the drawings comprises a chuck body 11 adapted for mounting on a machine tool. For example for the purpose of supporting a gear G for grinding of its bore B the body 11 may be mounted on the work spindle of an internal grinder, with its axis 12 concentric with the work spindle axis. Blocks 13 for seating the face of gear G are disposed in radial grooves 14 in the front face of the body and are secured by screws 15. Between the grooves 14 are radial V-grooves 16 seating pinion-supporting blocks 17. The bottoms of the V-grooves open into T-slots 18 containing anchoring nuts 19 for screws 20 which secure the blocks to the body 11.

Rotatable in each block 17 is the inner end 21 of one of the eccentric pins on whose outer ends 22 the pinions are mounted. The pinions, designated 23, fit ends 22 of the pins snugly. The pin ends 21 and 22 are cylindrical and eccentric to each other, the amount of eccentricity being shown at E in Fig. 4. The pins are held against axial displacement from the blocks 17 by retaining rings 24, Fig. 3. The pinions are secured to the outer ends of the pins by screws 25. Between the inner and outer ends 21 and 22 of each pin is a flange 26 having a locating notch 27 so positioned that when it is aligned with a notch 28 in the related block the axis of its cylindrical end 22 is farthest from axis 12. The notches 27, 28 may be held aligned by inserting in them a key 29, Fig. 4. For yieldably maintaining this same relationship the inner end 21 of each pin has a V-notch 31 for receiving a spring-backed detent in the form of a ball 32. The ball and its back in spring 33 are disposed in a thimble 34 which is screw-threaded into the block 17.

To ready the chuck for use the pinions 23 are first removed, the pins are turned to align notches 27, 28, and keys 29 are inserted in the aligned notches. Screws 20 are loosened and the blocks 17 adjusted to bring the outer ends 22 of all of the pins to the same distance from axis 12. This distance is determined either by calculation or by trial so that there will be enough backlash between the pinions and gear G to enable easy insertion of the gear during a subsequent chucking operation. Each of the blocks 17 is adjusted along its V-groove 16 to reflect the determined distance, such adjustment preferably being made with the aid of a gage block or blocks (not shown) interposed between the cylindrical surface of the pin end 22 and a cylindrical gage 35 (Fig. 2) that is inserted in a central bore 36 in body 11.

After the blocks 17 have been adjusted and screws 20 retightened, the pinions 23 are placed on the outer ends of the pins. A gear G is placed in mesh with the pinions and rotated through a small angle, preferably by means of a tool fitting in its bore and in the keyway in the bore. Such rotation has the effect of centering the gear while it is in metal-to-metal contact with the same side of the teeth of all of the pinions. The screws 25 are now applied and tightened, care being taken not to turn the pinions on the pins during this operation.

The keys 29 are now removed and the chuck is ready for use. To effect chucking a gear G is simply placed in mesh with the pinions, as shown in Figs. 1 and 2, and rotated until the pin-pinion units have turned far enough about the axes of inner pin ends 21 to cause the gear to be firmly clamped. Dechucking is effected by reverse rotation of the gear. Before any subsequent chucking operation for the same gear or an identical gear, the pinion-pin units should always be rotated to the position in which they are yieldably held against rotation by the spring-backed balls 32, thereby assuring that all of the cylindrical ends 22 (and therefore all of the pinions 23) are in the same relative position of eccentricity, which, in this preferred embodiment, is the position of maximum eccentricity.

While the method of use as described above has been found to give accurate results, a theoretically more accurate method is to substitute for the procedure described in the second paragraph above the following: The pinions are placed on the outer ends of the pins and a master gear G is engaged with them, this gear having or being mounted on a cylindrical shank or arbor which is centered in bore 36. This accurately centered master gear is rotated through an angle great enough to cause all of the pinions to turn. The pinions are now clamped to their respective pins by means of screws 25 without disturbing the metal-to-metal tooth contact which has been established between the master gear and all of the pinions.

It will be understood that by substituting pinions 23 of different pitch and helix angle the chuck shown and described herein can be made to accommodate a wide range of spur and helical work gears G. It will be further understood that the foregoing disclosure is made by way of example and illustration of the inventive principles involved, and that these principles may be embodied in other physical forms without departing from the spirit of our invention or from the scope of the appended claims.

What we claim as our invention is:

1. A gear chuck comprising a body, blocks adjustable on the body radially thereof, and pinions rotatable on the blocks about axes eccentric of their own axes.

2. A gear chuck according to claim 1 in which there are yieldable means for holding the pinions against rotation in the positions thereof wherein their axes are farthest apart.

3. A gear chuck according to claim 1 in which there are pins supporting the pinions on the blocks, the pins being rotatable in the blocks and the pinions being adjustable on the pins about axes which are eccentric to the axes of rotation of the pins.

4. A gear chuck according to claim 3 in which there are releasable means for holding the pins against rotation in the blocks in positions thereof wherein all of the pinions are in the same relative position of eccentricity.

5. A gear chuck according to claim 4 in which said holding means are positioned to hold the pins against rotation in the positions thereof wherein the pinion axes are farthest apart.

6. A gear chuck comprising a body adapted to be mounted for rotation, a plurality of blocks adjustable on the body radially of the axis of rotation of the body, a pin rotatable in each block about an axis parallel to said axis of rotation of the body, each pin having a cylindrical end eccentric of the pin's axis of rotation, pinions adjustable angularly on the eccentric ends of the pins, and means including spring-backed detents to yieldably hold the pins in the positions of rotation thereof wherein the axes of the eccentric cylindrical ends are farthest from the axis of rotation of the body.

7. A gear chuck according to claim 6 in which each pin and its supporting block have key-receiving notches which are aligned when the axes of the eccentric cylindrical ends are farthest from the axis of rotation of the body.

8. A gear chuck comprising a body adapted to be mounted for rotation, a plurality of pins rotatable relative to the body about axes which are equally spaced from the axis about which the body is to rotate, each pin supporting a pinion with the axis of the pinion eccentric to the axis about which the pin is rotatable in the body, and means for adjusting each pinion angularly about its axis with respect to its supporting pin.

9. A gear chuck according to claim 8 in which there are means for adjusting the pins relative to the body toward and away from said axis about which the body is to rotate.

10. A gear chuck according to claim 8 in which there are means to yieldably hold the pins so positioned that the axes of all of the pinions are in the same relative position of eccentricity.

References Cited in the file of this patent

UNITED STATES PATENTS

| | | |
|---|---|---|
| 1,219,740 | Johnson | Mar. 20, 1917 |
| 1,952,206 | Hogg | Mar. 27, 1934 |
| 2,182,614 | Garrison | Dec. 5, 1939 |
| 2,543,117 | Mackman | Feb. 27, 1951 |